C. W. CROCKETT.
APPARATUS FOR MAKING DIACETONE ALCOHOL.
APPLICATION FILED SEPT. 16, 1912.
1,075,284.
Patented Oct. 7, 1913.
2 SHEETS—SHEET 1.
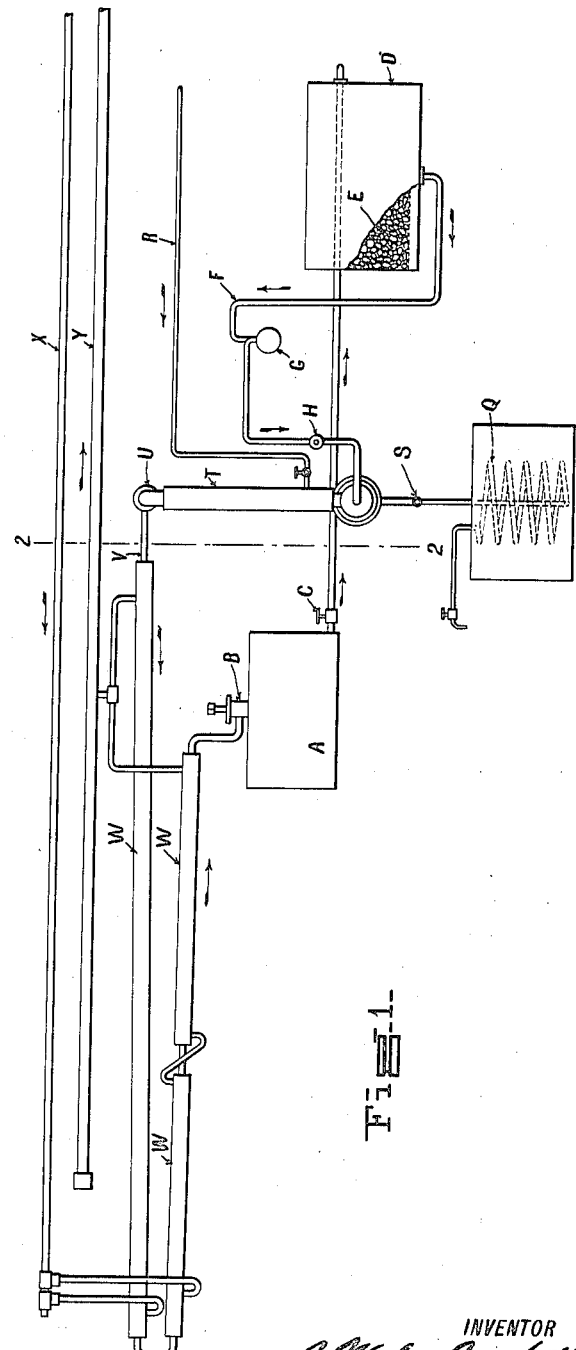

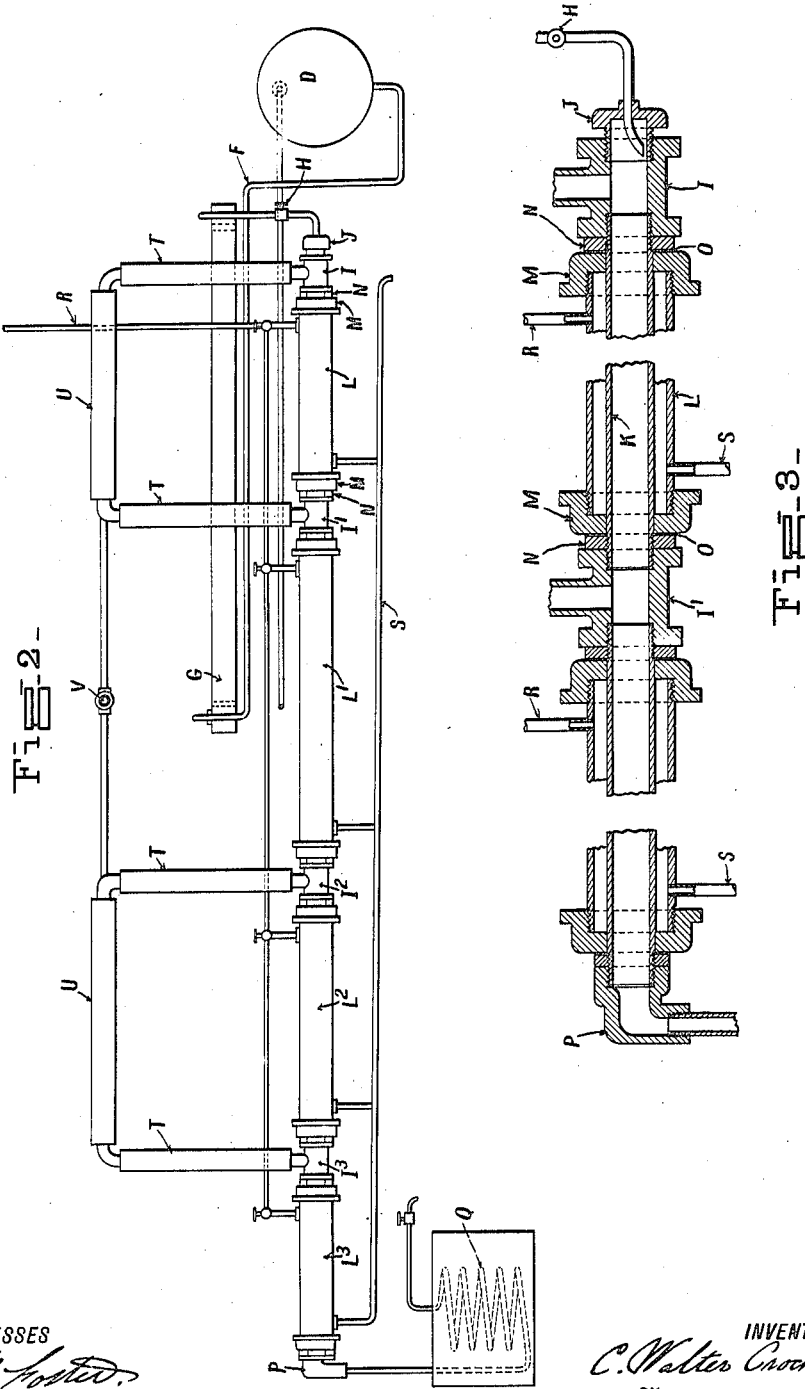

UNITED STATES PATENT OFFICE.

CYRENIUS WALTER CROCKETT, OF PASSAIC, NEW JERSEY, ASSIGNOR TO ALCO DEO COMPANY, A CORPORATION OF NEW JERSEY.

APPARATUS FOR MAKING DIACETONE ALCOHOL.

1,075,284.

Specification of Letters Patent.   Patented Oct. 7, 1913.

Application filed September 16, 1912. Serial No. 720,534.

*To all whom it may concern:*

Be it known that I, CYRENIUS WALTER CROCKETT, a citizen of the United States, residing at Passaic, in the county of Passaic and State of New Jersey, have invented certain new and useful Improvements in Apparatus for Making Diacetone Alcohol, of which the following is a specification.

This invention relates to an apparatus for effecting the conversion on an essentially commercial basis of a keytone into its polymerid, such as acetone into di-acetone alcohol. Better to enable the functional correlations, structural peculiarities, and characteristic arrangements of this structure to be comprehended, it may be noted that should a suitable catalyst, such as a hydroxid of an alkaline earth, as calcium hydroxid, be immersed under certain conditions in a given volume of acetone, it will, to a limited extent, polymerize such acetone, yielding a certain percentage of di-acetone alcohol, that has a higher boiling point and is miscible with the mother product; thus forming a mixed liquid. This polymerization can take place to a limited degree only, and conversely should calcium hydroxid be brought into contact with unadulterated di-acetone alcohol, a reconversion will at once ensue, forming a large quantity of acetone with a residual quantity of di-acetone alcohol.

Now, this invention seeks to provide an apparatus of a simple and inexpensive nature, in which one or more of the elements thereof will be enabled to operate in a catalytic capacity, whereby in a commercially inexpensive continuous operation acetone may be converted into di-acetone alcohol, having as great a concentration as may be desired.

Another object residing within the contemplation of this invention is to render available a commercially practical apparatus involving a series of evaporating units properly correlated with a polymerizing means whereby a continuous stream of undiluted di-acetone alcohol may be obtained from a suitable raw product.

In general, this invention seeks to provide an apparatus of the nature disclosed, which from a practical operative standpoint will possess a high degree of effectiveness and durability, which will be safe and also tight against loss due to vapors of the product escaping through seams, and which structurally considered will be of the greatest possible simplicity consistent with the results attained; being composed of but few parts, all designed to be manufactured at a minimum of cost, and which are so correlated as to be capable of being very readily assembled to accomplish the functions intended.

Other objects will be in part obvious from the annexed drawings, and in part indicated in the following description in connection therewith.

In order that this invention may be the more fully disclosed and made comprehensible to those skilled in its relating arts, drawings disclosing one of the many possible adaptations of the same are annexed as a part of this disclosure, but obviously the underlying features of this invention may otherwise be applied as modifications deducible therefrom and accordingly are to be comprehended within the scope of the claim. In such drawings, like characters of reference denote corresponding parts throughout all the views, of which:—

Figure 1 is an elevation of the apparatus, looking in the direction of the axis of the multiple unit evaporator. Fig. 2 is an elevation transverse to that of Fig. 1, looking to the right of the plane indicated by line 2—2 of Fig. 1. Fig. 3 is a vertical longitudinal median section taken through the multiple unit evaporator.

Continuing now by way of a more detailed description of this invention, A indicates a storage tank or reservoir constituting a source of raw material for the apparatus. This tank is adapted to be supplied with liquid acetone, either continuously or intermittently in sufficiently large quantities of the raw material, through an inlet B of suitable construction. From this reservoir, liquid acetone flows through a pipe having a valve C to regulate its rate and enters a converter D. Preferably this converter is located so as to be shaded in summer or otherwise maintained at as low a temperature as may be practicable, and it is characterized by a lining or filling of a permanent insoluble element that acts in a catalytic capacity in effecting the polymerization. Thus, one definite fixed element of this converter may consist of a mass of granulated calcium hydroxid E arranged somewhat after the fashion of a filter, so as to permit the liquid acetone to infiltrate through the same in intimate contact therewith. The effect of this is partially to polymerize the acetone, so that the product yielded by the converter is a mixed liquid composed in part of acetone and in part of di-acetone alcohol—the colder the temperature of conversion being, the greater the percentage of di-acetone alcohol. This mixed liquid is now subjected to a di-acetone alcohol enriching evaporation process, and to that end must be withdrawn entirely from the catalyzer to prevent reconversion. Thus, through a pipe F the mixed liquid is continuously carried to a suitable filter G of any suitable construction, so as to separate out the particles of calcium hydroxid, and thus completely eliminate the catalyzer. This filter in turn leads to one end of a multiple unit evaporator, through a pipe having a controlling valve H. The construction of this multiple unit evaporator is peculiar, and may best be understood by reference to Fig. 3. This evaporator is so constructed that when the mixed liquid is passed into one end, it is subjected to an evaporating process, whereby a certain amount of acetone is vaporized, thus partially enriching the product in di-acetone. The vapors are forthwith removed, and the enriched liquid flows to a succeeding point of evaporation, and this enriching process is renewed, and this is performed in succession throughout a series of evaporating units, until in the last unit substantially all of the acetone has been eliminated and the liquid may be substantially pure di-acetone, or as pure as desired, and at the same time give a continuous yield. The vapors successively eliminated are composed in the main of acetone, and are brought to a common focus and led to a suitable condenser and again subjected to the process, as will be explained presently. It may be stated that these products are of an exceedingly penetrating nature, that permeate and readily escape through ordinary joints, and accordingly the manufacture of a suitable commercial evaporator adapted for practical use, has been attended by many difficulties.

In the arrangement shown by Fig. 3 there are a series of 3-way T's, I, I' I², I³. A nipple J is screw threaded into the T I, and suffices to establish connection through the pipe with the filter, whereby the acetone may be supplied in the first instance. A pipe K constitutes a member of the first evaporating unit, and has its ends provided with accurately cut screw threads, as shown by the drawings. Before this pipe is connected to the T I, it has the steam jacket structure built thereon. This steam jacket consists of a pipe L, having its ends screw threaded and provided with caps M that are apertured, so that they may be slid over the pipe K and secured into the pipe section L. After the parts have been assembled as thus described, a lock nut N together with asbestos packing O is put in place and the lock nut N is screwed up tight to compress the packing and form a tight connection between the cap M and the pipe K. This unit is then connected at its ends with the T's I and I' by securing the ends of the pipe K into the same, and to enhance the tightness of the same packed joints may be used, and asbestos or other suitable packing may be inserted between the washer N and the end face of the T. A suitable series of units may thus be built up as indicated by L, L', L², and L³ on Fig. 2, and the end of the last evaporator pipe section is provided with a nipple P having a similar fluid tight connection therewith, and connected with such T is a condensing coil Q leading through a suitable container.

Steam is supplied to the steam jackets, preferably under approximately atmospheric pressure, by means of pipe R having suitable branches and control valves, and water and uncondensed steam are removed by the pipe S having branches leading to each steam jacket.

Uprising from each of the T's I, I', I², and I³ is a riser T, preferably packed with asbestos to maintain its temperature, and the tops of each pair of risers are joined by an asbestos connection pipe. The condenser pipe V leads from the connection U, and passes through water jacket W, whereby vapors of acetone are condensed and cooled into liquid form and ultimately it leads to the storage tank A. Cooling water may be supplied to the water jacket W as from the pipe X, and may be carried away by the pipe Y.

I therefore claim as new and desire to secure by Letters Patent:—

An apparatus for continuously converting acetone into di-acetone alcohol combining, a reservoir having a supply inlet and adapted to contain liquid acetone, a converter tank connected therewith containing a granular insoluble catalytic agent, adapted partially to polymerize concentrated liquid acetone into a mixed liquid composed in part of acetone and in part of di-acetone alcohol, a series of evaporating units, means for maintaining the same temperature in each unit, means for continuously conveying the mixed liquid from said converter tank in succession through said units, whereby said mixed liquid may be progressively enriched to a predetermined degree in its di-acetone alcohol content, a di-acetone condenser connected with the last evaporating unit, having a delivery outlet, an acetone condenser having a drain enabling the recovered acetone to be retreated in said converter tank, and means for conveying the vapors of acetone evolved in each evaporating unit to said condenser.

In testimony whereof, I have hereunto set my hand.

C. WALTER CROCKETT.

Witnesses:
 EDNA REMIG,
 CLARENCE B. FOSTER.